J. B. STROUD.
FILLER CAP FOR TIRE RIM CLAMPS.
APPLICATION FILED DEC. 19, 1918.

1,306,980.

Patented June 17, 1919.

Inventor
John B. Stroud,
By
Attorney

UNITED STATES PATENT OFFICE.

JOHN BELL STROUD, OF PASS CHRISTIAN, MISSISSIPPI.

FILLER-CAP FOR TIRE-RIM CLAMPS.

1,306,980.

Specification of Letters Patent. Patented June 17, 1919.

Application filed December 19, 1918. Serial No. 267,541.

*To all whom it may concern:*

Be it known that I, JOHN B. STROUD, a citizen of the United States of America, residing at Pass Christian, in the county of Harrison and State of Mississippi, have invented new and useful Improvements in Filler-Caps for Tire-Rim Clamps, of which the following is a specification.

The object of the invention is to provide a device for use in conjunction with tire rim clamp lugs so that when the lugs become loose and thereby permit the rim to rattle on the felly of a wheel the device may be employed to take up this wear and thereby secure the rim rigidly in place. To this end the invention comprises a hollow wedge shaped cup for engagement over the lug or tire rim clamp the latter, when attached, serving to hold the cap in place, forcing itself against the cap and the cap against the rim and the felly of the wheel.

The invention is shown and described in a specific embodiment, to which, however, it is not to be restricted. The right is reserved to make such changes or alterations as the actual reduction of practice may suggest in so far as such changes or alterations are compatible in spirit with the annexed claim.

Figure 1:
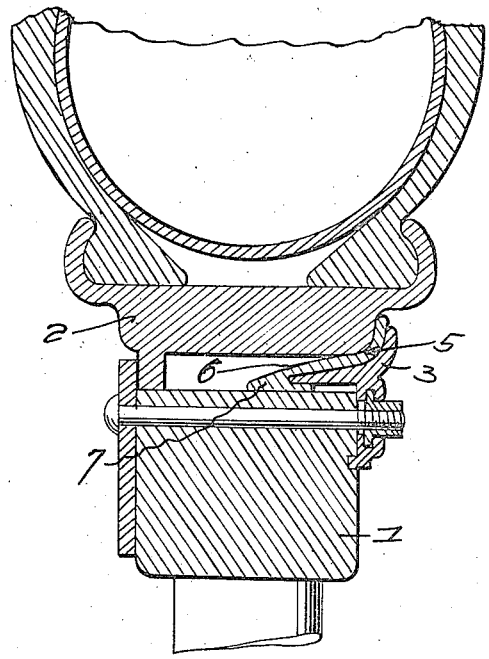
Figure 1 is a view partly in section and partly in elevation showing the application of the invention.
Figure 2:
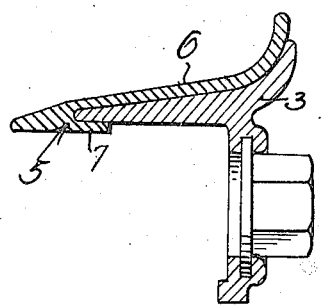
Fig. 2 is a transverse sectional view of a tire rim clamp lug having the filler cap mounted thereon.
Figure 3:
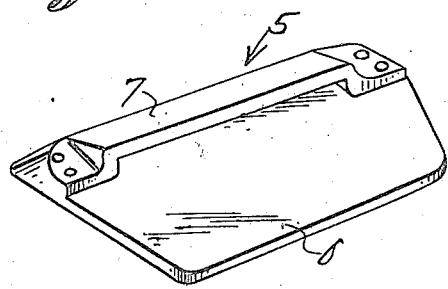
Fig. 3 is a perspective view of the filler cup *per se*.

As shown, the invention is employed to take up the wear on tire rim clamp lugs, and for the purpose of illustration there is shown in Fig. 1 a portion of a felly 1 of a wheel, the rim 2 being mounted upon this felly, as is usual, and being held in place by the clamp lug 3 with its laterally projecting wedge shaped portion which extends in between the felly and the rim. Continued use of this device and the continued removal and replacement of the rim upon the felly results in wear either of the lug or of the felly or of the rim with the result that in time the rim becomes loose and rattles upon the felly, even though the lugs may be attached as tightly as possible. To obviate this difficulty, the present invention is devised and comprises a filler cap generally designated 5. This filler cap is formed of any suitable material and comprises a wedge shaped body portion 6, designed to lie upon the top face of the laterally projecting wedge shape portion 4. The filler cap 5 is further formed with a bottom portion 7, lying against the under face of the laterally projecting wedge portion 4, and uniting at one longitudinal edge and at both ends with a body portion 6, thereby forming a pocket in which the free longitudinal edge of the laterally projecting wedge 4 may rest or engage.

The construction of the filler cap 5 as a whole, is wedge shaped and in the event of wear upon certain lugs or the parts of the wheel with which they engage, the particular lug is removed and one of these filler caps attached to its wedge portion 4, whereupon the lug is re-attached to the felly and the filler cap thereby being forced in between the felly and the rim compensates for any wear that previously existed between the rim clamp, the rim and the felly.

It is believed that the foregoing description and the accompanying drawings set forth the construction, use and advantages of the invention in such a way as to make any further description unnecessary.

The invention having been described what is claimed as new and useful, is:

The combination with a tire rim clamp having a laterally projecting wedge shape portion for engagement between the felly and tire rim of a wheel, of a device attachable to the wedge shape portion and comprising a body portion lying on top of a wedge shaped portion, and a bottom portion lying against the underface of the wedge shaped portion and uniting at its ends and one longitudinal edge with the body portion, the device as a whole being wedge shaped for the useful purpose specified.

In testimony whereof I affix my signature.

JOHN BELL STROUD.

Witnesses:
REBELLIA A. BRANDT STROUD,
ANNA M. BRANDT.